Figure 1:
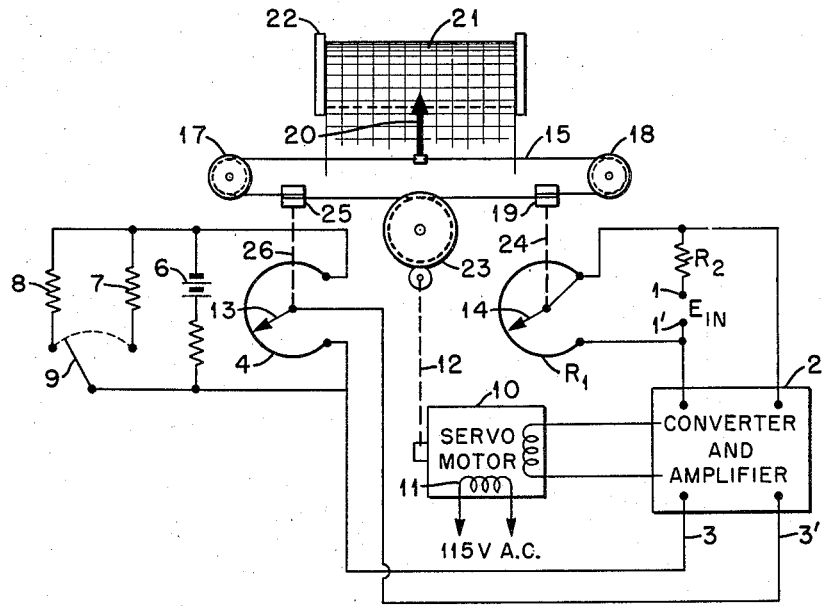

Dec. 30, 1958

W. G. S. FORT 2,866,939

ZERO SUPPRESSION FOR RECORDERS

Filed June 11, 1956

INVENTOR.

BY William G. S. Fort

Roland A. Anderson

ATTORNEY

2,866,939

ZERO SUPPRESSION FOR RECORDERS

William G. S. Fort, Oak Ridge, Tenn., assignor to the United States of America as represented by the United States Atomic Energy Commission Application June 11, 1956, Serial No. 590,797

1 Claim. (Cl. 324—131)

The present invention relates to a zero-suppression circuit for self-balancing recorder instruments, and more especially to an improved electromechanical self-balancing recorder having provision for automatic zero-suppression or elevation.

Self-balancing recorders are utilized in great profusion in both industrial processes and in research. Sensing elements such as thermocouples, radiation detectors, phototubes, strain gauges and the like measure a selected variable and provide an output D. C. voltage. Other sensing elements provide measured D. C. currents. In the typical recorder, the input voltage or current is balanced against a known voltage or current flowing through a potentiometer. Any unbalance is amplified and used to energize a motor which in turn moves the arm of the potentiometer to a null position. The motor also moves a recording pen across the chart of the recorder to provide a permanent record of the input signal received.

To enable measurement of a voltage or current greater than that causing full scale deflection of the recorder, the slide wire may be connectible in series with precision resistors of suitable values to form a voltage divider. Then the slide wire span covers only a fraction of the voltage from the sensing element, and full scale reading may be obtained with only a fraction of the voltage required when no fixed resistors are used. Zero-suppression is normally accomplished with a manual toggle switch which connects the desired resistor into the potentiometer circuit. Other zero-suppression circuits utilized a bucking voltage supply, either an electronically regulated supply or a battery, to cancel a selected portion of the input signal. Voltage dividers do not accurately accomplish zero-suppression because they suppress both the normal input signal and also the variations in that signal by the same factor. Bucking voltage supplies do permit the full variation to be impressed upon the recorder, but these supplies are relatively expensive and complex, since they require extremely close regulation. Bucking batteries need to drift in use and often require auxiliary charging apparatus.

Accordingly, it is a primary object of the present invention to provide a recorder with auxiliary zero-suppression means which does not require expensive and complex circuitry, involves no signal-bucking batteries, and is automatic in its operation. A further object of the invention is to provide an automatic zero-suppression circuit which is more accurate than the voltage divider type, in that the entire variation to be measured is impressed upon the recorder input, rather than only a proportional part thereof.

Figure 2:
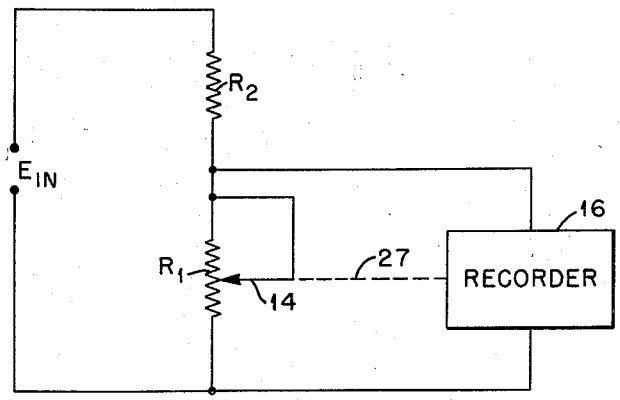

These and other objects of the invention will become apparent from the following detailed description of a preferred embodiment thereof, when read in connection with the appended drawings, wherein:

Figure 1 illustrates the invention incorporated in a typical self-balancing recorder, and Figure 2 is an electrical schematic diagram illustrating the invention.

In accordance with the invention, the input signal to be measured is applied across a voltage divider comprising a fixed resistor and a variable resistor. The voltage drop across the variable resistor is applied to the input terminals of the recorder. A mechanical connection is provided between the servo motor of the recorder and the arm of the variable resistor to determine the magnitude of the variable resistor in response to movement of the servo. Coupling is affected such that the effective resistance $r$ of the variable resistor is maintained equal to the product $$\frac{R1}{S}e$$

where R1 is the maximum value of the variable resistor, $e$ is the signal voltage impressed upon the recorder, and S is the full scale voltage of the recorder. It has been found that in such case $$e = E - \frac{SR2}{R1}$$

where E is the full input voltage received. From this relationship it has been determined that zero-suppression by a desired amount can be achieved by choosing values for the ratio $$\frac{R2}{R1}$$

for any given value of E to be expected. With such zero-suppression, the full value of any variation from the normal selected value of E will be impressed upon the recorder in its entirety. The amount of zero-suppression provided may be readily adjusted in practice by changing the values of R2.

Referring now to Figure 1, in a typical self-balancing recorder the voltage to be measured is applied to input terminals 1, 1' to a converter and amplifier unit 2. The later unit also receives an input voltage from terminals 3, 3' which are connected respectively to the moveable arm 13 and to one side of the potentiometer 4. A source 6 of reference voltage is bridged across the potentiometer and causes a current to flow therethrough. Resistors 7 and 8 may also be connectible across the potentiometer by means of a switch 9. Any difference between the voltages or currents received at input terminals 1, 1' and 3, 3' is converted by the converter to alternating current, amplified, and fed to one winding of a two-phase servo motor 10. The winding 11 may be connected to a source of alternating current such as the 115 volt A. C. line. The shaft of the servo motor, represented by dotted line 12, is coupled to the movable arm 13 of potentiometer 4. The motor drives the arm 13 until the condition of null balance exists.

Referring now to Figure 2, according to the invention the input voltage E is applied across a voltage divider including resistors R2 and R1. R1 is a variable resistor having a movable arm 14 which is mechanically coupled to the servo motor shaft 12 through coupling 27. The voltage drop appearing across R1 is applied to the input terminals 1, 1' of the recorder 16. An unbalanced condition causes the recorder to drive the arm 14 through coupling 27 as described more fully in connection with Figure 1.

Referring again to Figure 1, one suitable means known to the prior art for moving the recorder pen is shown by way of illustration. In this arrangement, servo shaft 12 rotates a reel 23 about which is wound a wire 15. The wire forms a continuous loop around a capstan or drum 25, pulleys 17, 18 another capstan 19, and reel 23. The recorder pen 20 is carried by the wire across the face of chart 21, which is normally movable in the vertical plane by a roller 22 as shown. Variable resistor R1 may be provided with a shaft 24 connected to moveable arm 14 and turned by capstan 19 responsive to travel of the wire 15.

The voltage to be measured, E, is applied to input terminals 1, 1'. Resistor R2 and variable resistor R1 form a voltage dividing network, and the signal developed across R1 is applied to the input of converter and amplifier unit 2. The unit 2 receives the signal applied at terminals 1, 1' and that applied from the potentiometer 4 through terminals 3, 3' and drives servo motor 10 in response to the difference between the two input signals. The servo shaft 12 drives reel 23, moving wire 15, driving capstan 25, turning shaft 26 connected to arm 13, and thereby moving arm 13 to balance the input signals. But wire 15 also moves arm 14, changing the input signal at 1, 1'. This change causes further driving of servo 10 and arm 13 to bring about a balance condition. The extra movement required for each input voltage thus automatically provides the selected zero-suppression.

Since resistor R2 determines the amount of zero-suppression provided, that resistor is preferably made readily removable; alternatively, serveral precision resistors may be provided, with a switch arrangement for selecting one resistor R2 to obtain the desired amount of zero-suppression.

Analysis of the system shown in Figure 2 will determine the amount of zero-suppression provided. Since $$r = \frac{R1}{S} e$$

by virtue of the coupling provided as above defined, and $$e = E \frac{r}{r + R2}$$

as in a voltage divider, then $$e = E \frac{\frac{R1}{S} e}{\frac{R1}{S} e + R2}$$

Then dividing by $e$, $$1 = \frac{\frac{ER1}{S}}{\frac{R1}{S} e + R2}$$

Solving for $e$, $$e = \frac{\frac{ER1}{S} - R2}{\frac{R1}{S}}$$

Then $$e = \frac{ER1 - SR2}{R1}$$

or $$e = E - \frac{SR2}{R1}$$

It is apparent that the term $$\frac{SR2}{R1}$$

is a constant, so it may be seen that the full value of the variation in E will also appear in $e$ and be applied to the recorder, while only the constant amount $$\frac{SR2}{R1}$$

will be balanced out. Therefore, the object of applying the variations in full, while yet providing the desired zero-suppression, is achieved.

By way of further illustration, assume a conventional recorder having a full-scale deflection $S=50$ volts to be used to record an input voltage varying about a norm of $E=50$ volts. If a suppression factor of 25 volts is desired, then R2 is chosen as ½ R1—say R2=180 ohms and R1=360 ohms. Then $$e = 50 - \frac{50 \cdot 180}{360} = 25 \text{ volts}$$

The winding on R1 may be uniform, so the resistance changes 1 ohm per degree of revolution. Upon a change in E from 50 volts to 75 volts, for example, the shaft 12 will turn, driving arms 13, 14 until the voltages at both converter-amplifier inputs balance each other. If battery 6 and potentiometer 4 are so chosen that rotation of arm 13 by 180 degrees balances a 25 volt increase in $e$ at the other converter-amplifier input, and arm 14 turns uniformly with arm 13, beginning at the lower end ($r=0$), and increasing the resistance $r$ as the arm rotates, then operation is as follows. At the norm, $E=50$ volts, $e=25$ volts, so arm 13 is at the 180-degree point. Arm 14 is therefore also at the 180-degree point of its travel. Then if E becomes 37.5 volts, $e=12.5$ volts, unbalance occurs, servo 10 drives, arms 13, 14 rotate 90 degrees, and $r=90$ ohms. If E becomes 75 volts, $e=50$ volts, the arms turn 270 degrees and $r=360$ ohms; and so forth. Other values for the components may be utilized equally as well, depending upon the suppression desired.

Having described the invention, what is claimed as novel is:

In a self-balancing recorder having a full-scale voltage rating of S volts, including a two-phase servo motor, a converter and amplifier unit having a pair of two-terminal inputs and an output coupled to one phase winding of said servo motor, a source of reference voltage coupled to the other phase winding, and source of a reference signal coupled to one of said inputs and including a slidewire having a movable arm, the zero-suppression means comprising a fixed resistor and a variable resistor connected in series, means for impressing an input signal to be recorded in series with said resistors, said variable resistor having a movable contact arm, means connecting said two terminals of the other of said inputs across said variable resistor and means coupling both said arms to said servo motor, to move said arms in proportion to the voltage impressed upon said input terminals, said resistors being of such magnitudes that the ratio $$\frac{R1}{R2} = \frac{S}{Z}$$

where R1 and R2 are the magnitudes of the variable and fixed resistors, respectively, and Z is the selected zero-suppression voltage.

References Cited in the file of this patent

UNITED STATES PATENTS 2,756,376    Davis et al. _____ July 24, 1956

UNITED STATES PATENT OFFICE
CERTIFICATE OF CORRECTION

Patent No. 2,866,939                                                     December 30, 1958

William G. S. Fort

It is hereby certified that error appears in the printed specification of the above numbered patent requiring correction and that the said Letters Patent should read as corrected below.

Column 1, line 53, for "need" read -- tend --; column 4, line 46, after "arm," strike out "the".

Signed and sealed this 16th day of June 1959.

(SEAL)
Attest:

KARL H. AXLINE
Attesting Officer

ROBERT C. WATSON
Commissioner of Patents